(12) United States Patent
Bowman et al.

(10) Patent No.: US 7,157,642 B2
(45) Date of Patent: Jan. 2, 2007

(54) HANDHOLE REINFORCING FRAME FOR ROUND UTILITY POLES

(75) Inventors: Joseph Manuel Bowman, Abingdon, VA (US); Ray Carl Minor, Abingdon, VA (US)

(73) Assignee: Hapco Aluminum Pole Products, Abingdon, VA (US)

( * ) Notice: Subject to any disclaimer, the term of this patent is extended or adjusted under 35 U.S.C. 154(b) by 0 days.

(21) Appl. No.: 11/208,538

(22) Filed: Aug. 23, 2005

(65) Prior Publication Data

US 2006/0185874 A1 Aug. 24, 2006

(51) Int. Cl.
*H02G 7/20* (2006.01)

(52) U.S. Cl. .................. 174/45 R; 174/50; 174/37; 174/40 R; 248/200

(58) Field of Classification Search .............. 174/45 R, 174/40 CC, 37, 38, 39, 50, 58, 40 R; 248/545, 248/544, 121, 125.1, 125.8, 200, 200.1, 219.1; 220/3.4, 3.5, 3.7, 4.02, 3.2, 3.3; 52/50
See application file for complete search history.

(56) References Cited

U.S. PATENT DOCUMENTS

| | | | | |
|---|---|---|---|---|
| 3,853,291 A | * | 12/1974 | Burke | .................. 174/50 |
| 5,205,668 A | * | 4/1993 | Adams | ........................ 52/20 |
| 5,483,019 A | | 1/1996 | Tourigny | |
| 5,524,411 A | | 6/1996 | Crossman | |
| 5,820,255 A | | 10/1998 | Carrington et al. | |
| 5,899,024 A | * | 5/1999 | Stannard | ....................... 52/20 |
| 6,685,154 B1 | * | 2/2004 | Blyth et al. | .............. 248/219.1 |
| 6,688,806 B1 | * | 2/2004 | Kuan | ............................ 52/20 |
| 7,059,096 B1 | * | 6/2006 | Kuebler et al. | ........... 174/45 R |

* cited by examiner

*Primary Examiner*—Angel R. Estrada
(74) *Attorney, Agent, or Firm*—Buchanan Ingersoll & Rooney PC

(57) ABSTRACT

A frame for reinforcing a handhole of a round metallic utility pole, includes a generally elliptical body defining a major axis and a minor axis and forming a generally elliptical outer periphery, and a generally elliptical inner periphery bordering an opening extending through front and back sides of the body, the opening defining a center axis of the frame. A flange is formed integrally with the body and projects forwardly therefrom at a location spaced inwardly from the outer periphery, wherein the flange is separated from the outer periphery by a forwardly facing shoulder surface of the body. The flange includes an outer flank facing outwardly and intersecting the shoulder surface, wherein the flange outer flank forms an oblique angle with the center axis as seen in a sectional view taken along the major axis, and lies substantially parallel to the center axis as seen in a sectional view taken along the minor axis.

2 Claims, 3 Drawing Sheets

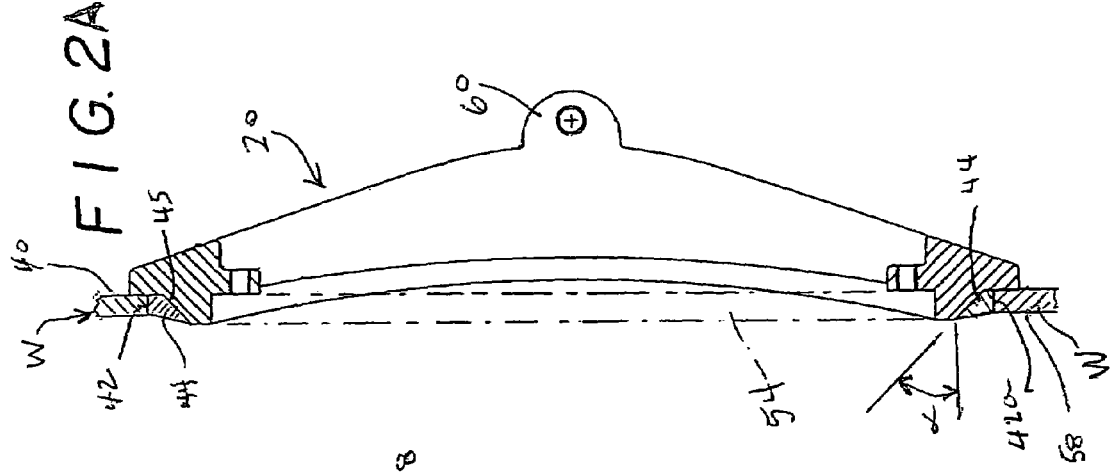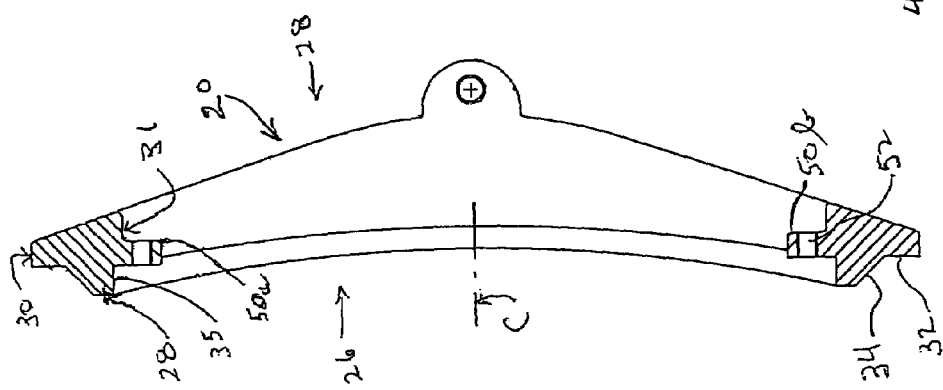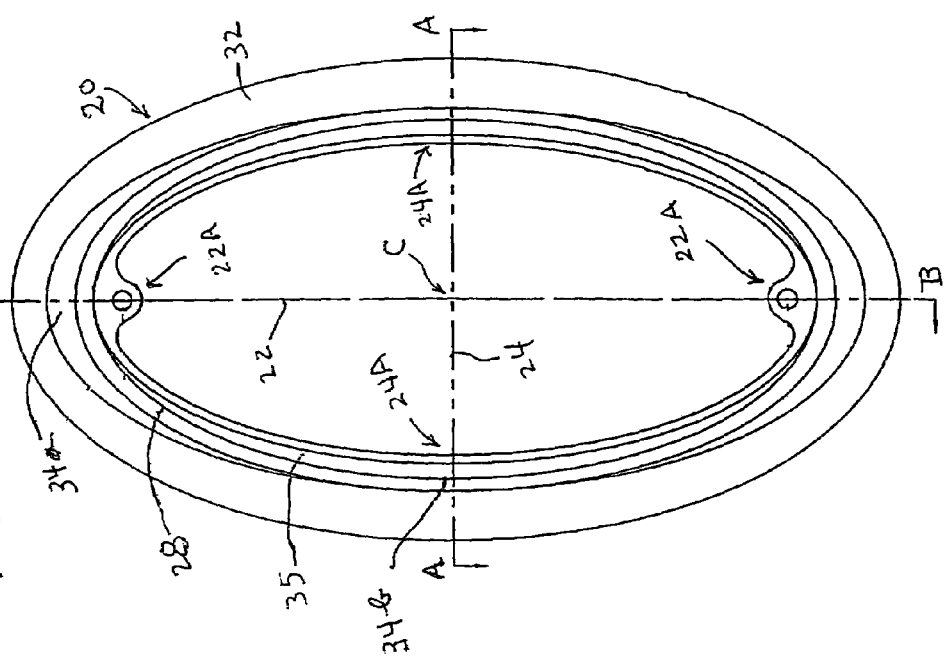

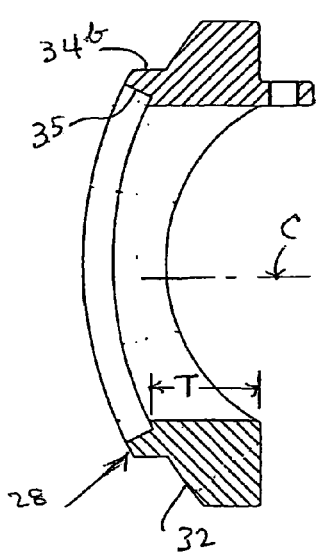 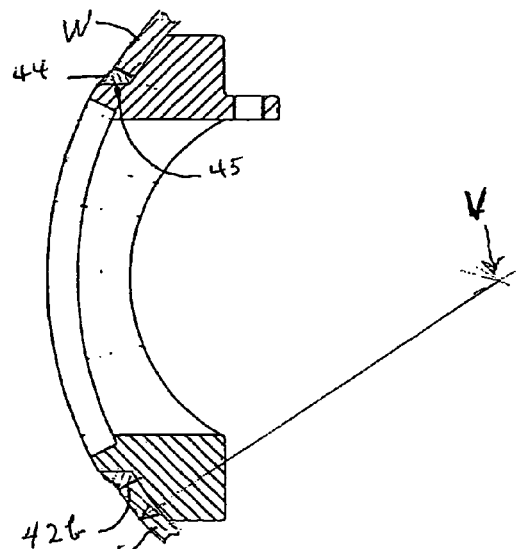
FIG. 3  FIG. 3A
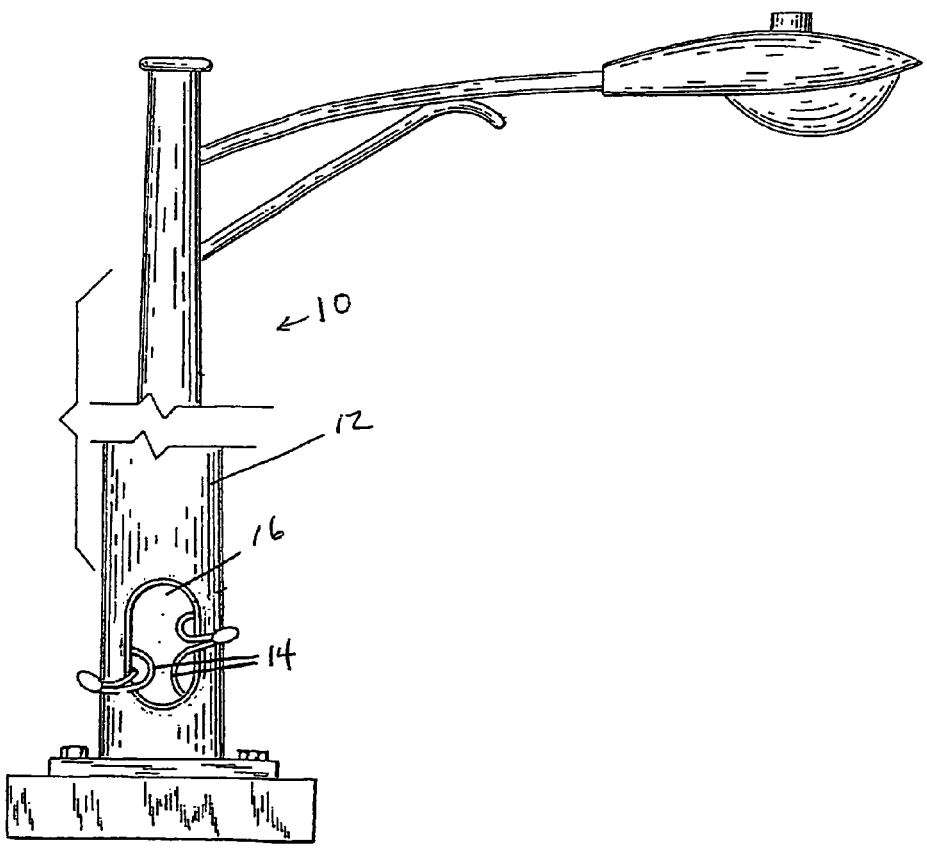
FIG. 5
(PRIOR ART)

HANDHOLE REINFORCING FRAME FOR ROUND UTILITY POLES

BACKGROUND OF THE INVENTION

The present invention relates generally to round utility poles and, in particular, to a frame adapted to reinforce a handhole of the pole and form a mount for a handhole cover.

As depicted in FIG. 5, a utility pole 10, such as a light pole, is typically formed of a hollow metal shaft 12 in which electrical wiring 14 is disposed. In order to provide access to the wiring, a handhole or access port 16 is formed in the pole near the bottom thereof. In order to prevent unauthorized access to the wiring, a cover (not depicted) is removably mounted to the pole to overlie the handhole. Examples of handholes and covers formed in utility poles can be found in U.S. Pat. Nos. 5,483,019; 5,524,411; and 5,820,255.

Highway regulations impose strict standards regarding the ability of metal utility poles to resist loading. It will be appreciated that the removal of material from the pole in order to form the handhole weakens the pole, thereby reducing the ability of the pole to withstand certain loadings.

It is an object of the present invention to provide a reinforcing frame adapted to be secured to a metal utility pole in such a way as to reinforce the handhole while providing a structure to which the handhole cover can be secured.

SUMMARY OF THE INVENTION

One aspect of the invention relates to a frame for reinforcing a handhole of a round metallic utility pole, the frame including a generally elliptical body defining a major axis and a minor axis and forming generally elliptical outer and inner peripheries. The inner periphery borders an opening extending through front and back sides of the body, the opening defining a center axis of the frame. A flange is formed integrally with the body and projects forwardly therefrom at a location spaced inwardly from the outer periphery, wherein the flange is separated from the outer periphery by a forwardly facing shoulder surface of the body. The flange includes an outer flank facing outwardly and intersecting the shoulder surface. That flange outer flank forms an oblique angle with the center axis as seen in a sectional view taken along the major axis, whereas the flank lies substantially parallel to the center axis as seen in a sectional view taken along the minor axis.

The invention also pertains to a utility pole having a handhole in which the reinforcing frame is welded in order to reinforce the handhole and provide a mount for a cover.

BRIEF DESCRIPTION OF THE DRAWING

The objects and advantages of the invention will become apparent from the following detailed description of a preferred embodiment thereof in connection with the accompanying drawings in which like numerals designate like elements and in which:

FIG. 1 is a front elevational view of a handhole-reinforcing frame according to the invention.

FIG. 2 is a sectional view taken along line B—B in FIG. 1.

FIG. 2A is a view similar to FIG. 2 showing the frame welded to a shaft of a utility pole.

FIG. 3 is a sectional view taken along line A—A in FIG. 1.

FIG. 3A is a view similar to FIG. 3 showing the frame welded to the shaft of the utility pole.

FIG. 5 is a front elevational view of a prior art utility pole.

DESCRIPTION OF A PREFERRED EMBODIMENT

Figure 4:
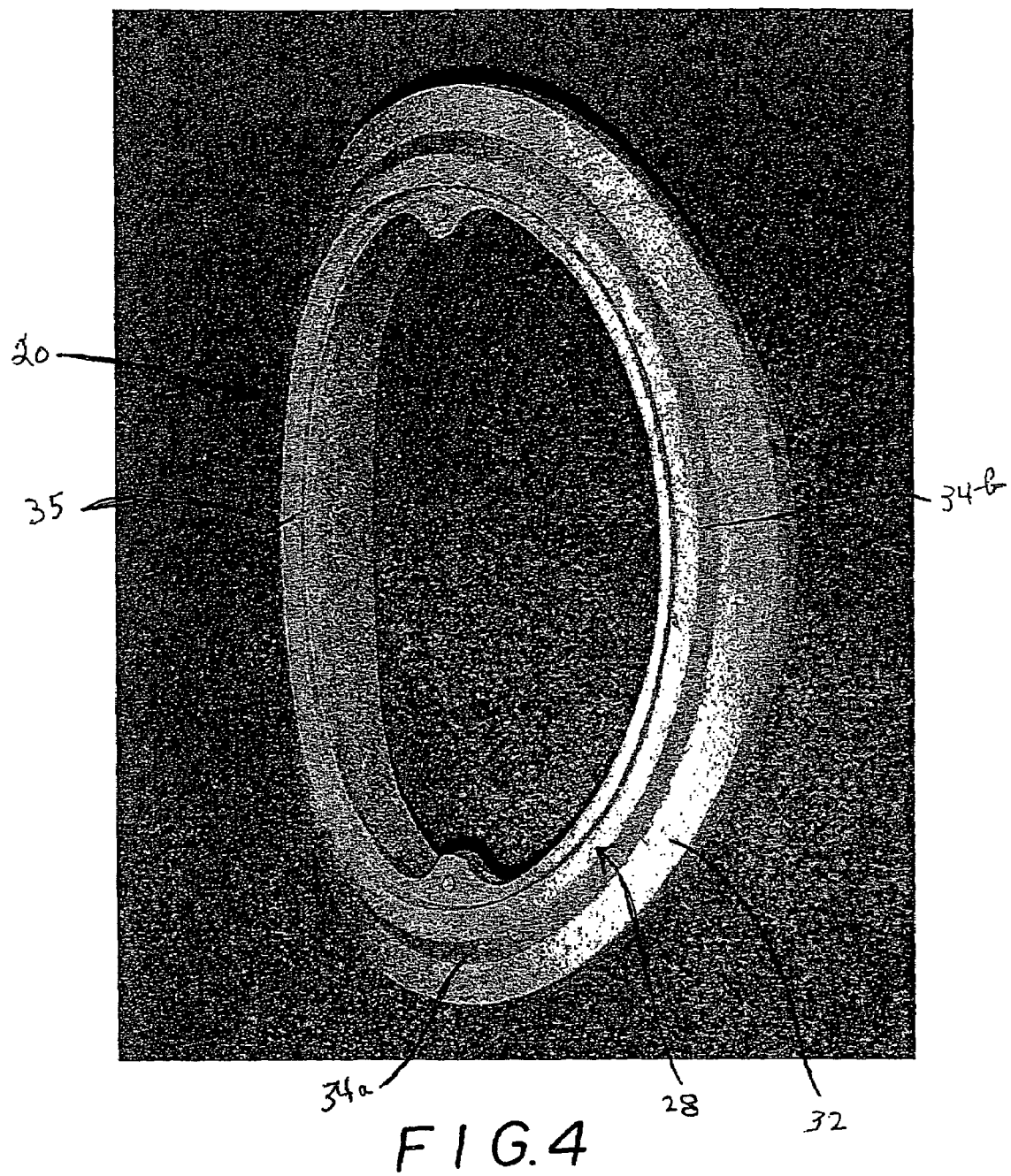
FIG. 4 is a front perspective view of the handhole-reinforcing frame.

Depicted in FIGS. 1–4 is a reinforcing frame 20 adapted to be mounted in the handhole of a round metal utility pole, i.e., a utility pole having a circular cross-sectional shape. The outer and inner perimeters of the frame 20 are elliptical in shape, each having major and minor axes 22, 24, respectively. The frame 20 is to be mounted in a correspondingly shaped handhole formed in a wall W of the utility pole (FIG. 2A), with the major axis 22 oriented parallel to the vertical longitudinal axis of the pole. The frame defines a center axis C oriented perpendicularly relative to the major and minor axes 22, 24, and to the vertical longitudinal axis V of the utility pole.

As used herein, the terms "front" and "rear" relate to a direction along the center axis C relative to the longitudinal axis of the utility pole. Thus a "front" side of frame 20 faces away from the pole's longitudinal axis, and a "rear" side 28 of the frame faces toward the pole's longitudinal axis.

Moreover, the terms "outer" and "inner" as used herein relate to a direction transversely of the frame's center axis C. That is, the frame includes an "outer" perimeter 30 facing away from the center axis C, and an "inner" perimeter 31 facing toward the center axis C.

The front side 26 of the frame includes a forwardly projecting elliptical flange 28 that runs continuously (endlessly) around the front side of the frame. The flange 28 is spaced inwardly from the outer perimeter 30, wherein the frame forms a forwardly facing shoulder 32 between the flange 28 and the outer perimeter 30. As viewed in cross section taken along the major axis 22 (FIG. 2), the shoulder is straight (i.e., parallel to the pole's longitudinal axis), whereas the shoulder is convexly curved as viewed in cross section along the minor axis 24 (FIG. 3) in order to conform to the curvature of the pole wall W.

The flange 28 includes an outer flank 34 which faces outwardly (away from the center axis), and an inner flank 35 which faces inwardly (toward the center axis C).

FIGS. 2A and 3A show the frame being positioned in the elliptical handhole of the cylindrical wall W of the utility pole, with the shoulder 32 engaging the inside cylindrical surface 40 of the wall W, and the flange outer flank 34 spaced from an edge 42 of the handhole.

In accordance with the invention, a full penetration groove weld 44 is formed within an elliptical groove 45 that is bordered by: the flange outer flank 34, the handhole edge 42, and the shoulder 32. In order to be able to form a full penetration weld, it is desirable that the groove be beveled or flared, so that the cross section of the groove widens in a forward direction (i.e., widens to the left in FIGS. 2A, 3A). By flaring the groove in that manner, it becomes possible to insert the welding electrode deep into the groove in order to ensure that the weld fully penetrates the groove, i.e., reaches the shoulder 32 which forms a backing for the weld.

As seen in the cross sectional view of FIG. 2A, which is taken through the two opposing apexes along the major axis 22 of the ellipse (i.e., the major apexes), the portion 42a of the handhole edge 42 is oriented substantially perpendicular to the pole's longitudinal axis V, and the portion 34a of the flange outer flank 34 facing the portion 42a of the handhole edge is inclined forwardly and at an angle a relative to the handhole edge portion 42a, and thus is also inclined at the angle a relative to the center axis C.

On the other hand, in the cross sectional view according to FIG. 3A, which is taken through the two opposing apexes along the minor axis 24 (i.e., the minor apexes), the handhole edge portion 42b is oriented substantially perpendicularly relative the pole's longitudinal axis V, and the portion 34b of the flange flank 34 facing that portion 42b of the handhole edge extends parallel to the center axis C.

Thus, the flange outer flank 34 gradually transitions from the inclined state at the major apexes to the non-inclined state at the minor apexes. That is, the outer flank transitions from being inclined relative to the handhole axis C at the major apexes, to being parallel to that axis C at the minor apexes. That ensures that the groove 45 is always properly flared along its entire extent to enable a full penetration weld to be formed.

After being formed, the full penetration groove weld 44 shall be fully backed and ground smooth to provide for a weld consistent with Detail 9 of Table 11-2 of the AASHTO "Standard Specifications for Structural Supports for Highway Signs, Luminaire and Traffic Signals" 4$^{th}$ Edition, 2001.

As can be seen by comparing FIGS. 2 and 3, the cross-sectional size of the frame transitions from being large at the minor apexes (FIG. 3) to being smaller at the major apexes (FIG. 2). As a result, the portions of the frame extending generally parallel to the major axis are thicker and stronger than the remaining portions of the frame, in order to compensate for the fact that more material is removed from the pole along the major axis than along the minor axis. Thus, the frame provides more reinforcement for the pole in regions thereof that have been weakened the most by cutting out the handhole.

The handhole can be formed in the shaft in any suitable way in order to form the handhole edge 42 such that it transitions between the inclined portion 42b (FIG. 3A) to the non-inclined portion 42a (FIG. 2A). One convenient way of forming the handhole involves using a milling tool of which the centerline cuts concentrically with the circle defined by the shaft tube cross section.

Upper and lower lugs 50a, 50b are provided on the frame 20, projecting inwardly from the inner perimeter 31. The lugs include apertures 52 for receiving bolts to enable a cover 54 to be removably attached to the frame.

When positioned to cover the handhole, the cover 54 will appear to lie flush with the exterior surface 58 of the pole wall W. The handhole reinforcing frame 20 shall have within it a grounding lug 60 drilled and tapped for to accommodate the owner's grounding provisions.

The frame 20 and the cover 54 can be formed of any suitable material, but the frame is preferably of cast aluminum 356-T6 alloy, and the cover is preferably of 5052-H32 aluminum alloy.

It will be appreciated that the reinforcing frame 20 effectively reinforces the handhole and provides a mount for the handhole cover. The shoulder 32 of the frame provides backing for the full penetration weld.

Both micro etch and full scale destruction testing has demonstrated the weld integrity in accordance with AWS D-1.2 and has demonstrated that a pole provided with the above-described reinforcing frame 20 can provide a factor of safety as determined and prescribed in Section 9 of part 1A "Specification for Aluminum Structures Allowable Stress Design" of the Aluminum Association "Aluminum Design Manual" 6$^{th}$ Edition, 1994 which meets the loading requirements set forth in the aforementioned AASHTO LTS Specifications.

What is claimed is:

1. A frame for reinforcing a handhole of a round metallic utility pole, the frame comprising a generally elliptical body defining a major axis and a minor axis and forming a generally elliptical outer periphery, and a generally elliptical inner periphery bordering an opening extending through front and back sides of the body, the opening defining a center axis of the frame, a flange formed integrally with the body and projecting forwardly therefrom at a location spaced inwardly from the outer periphery, wherein the flange is separated from the outer periphery by a forwardly facing shoulder surface of the body, the flange including an outer flank facing outwardly and intersecting the shoulder surface, wherein the flange outer flank forms an oblique angle with the center axis as seen in a sectional view taken along the major axis, and lies parallel to the center axis as seen in a sectional view taken along the minor axis.

2. A utility pole comprising:
    a metallic shaft having a round base in which a handhole is formed, the handhole being of generally elliptical shape defining major and minor axes, the major axis extending parallel to a longitudinal axis of the shaft, the handhole defining a center axis extending perpendicular to the longitudinal axis, an edge of the handhole including first and second portions intersected by the major and minor axes, respectively, the first portion extending substantially parallel to the center axis, and the second portion forming an oblique angle relative to the center axis; and
    a reinforcing frame disposed in the handhole, the frame comprising a generally elliptical body defining major and minor axes and forming a generally elliptical outer periphery, and a generally elliptical inner periphery bordering an opening extending through front and back sides of the body, the defining opening defining a center axis of the frame, the frame's major and minor axes and center axis coinciding with the handhole's major and minor axes and center axis, respectively, the body including an integral flange projecting forwardly at a location spaced inwardly from the outer periphery, wherein the flange is separated from the outer periphery by a forwardly facing shoulder surface of the body, the flange including an outer flank facing outwardly and intersecting the shoulder surface, wherein the flange outer flank forms an oblique angle with the center axis as seen in a sectional view taken along the major axis, and lies parallel to the center axis as seen in a sectional view taken along the minor axis, the line of intersection between the flange flank and the shoulder surface being spaced inwardly from the handhole edge to form an elliptical groove therebetween in which a full penetration groove weld is formed to secure the frame to the shaft.

* * * * *